Figure 2:
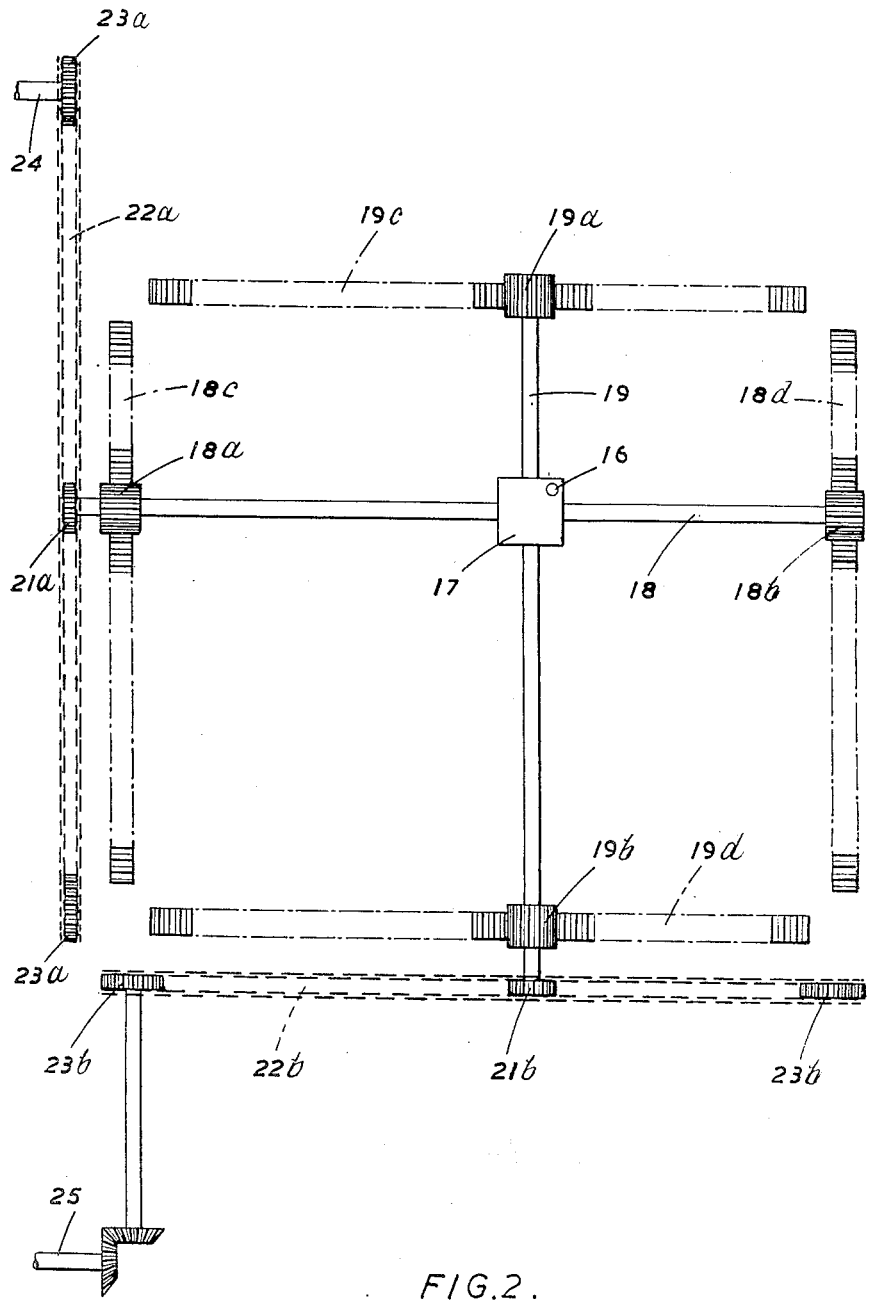

March 11, 1952 H. L. REILLY ET AL 2,588,763
NAVIGATION INSTRUMENT
Filed Feb. 26, 1948 2 SHEETS—SHEET 1
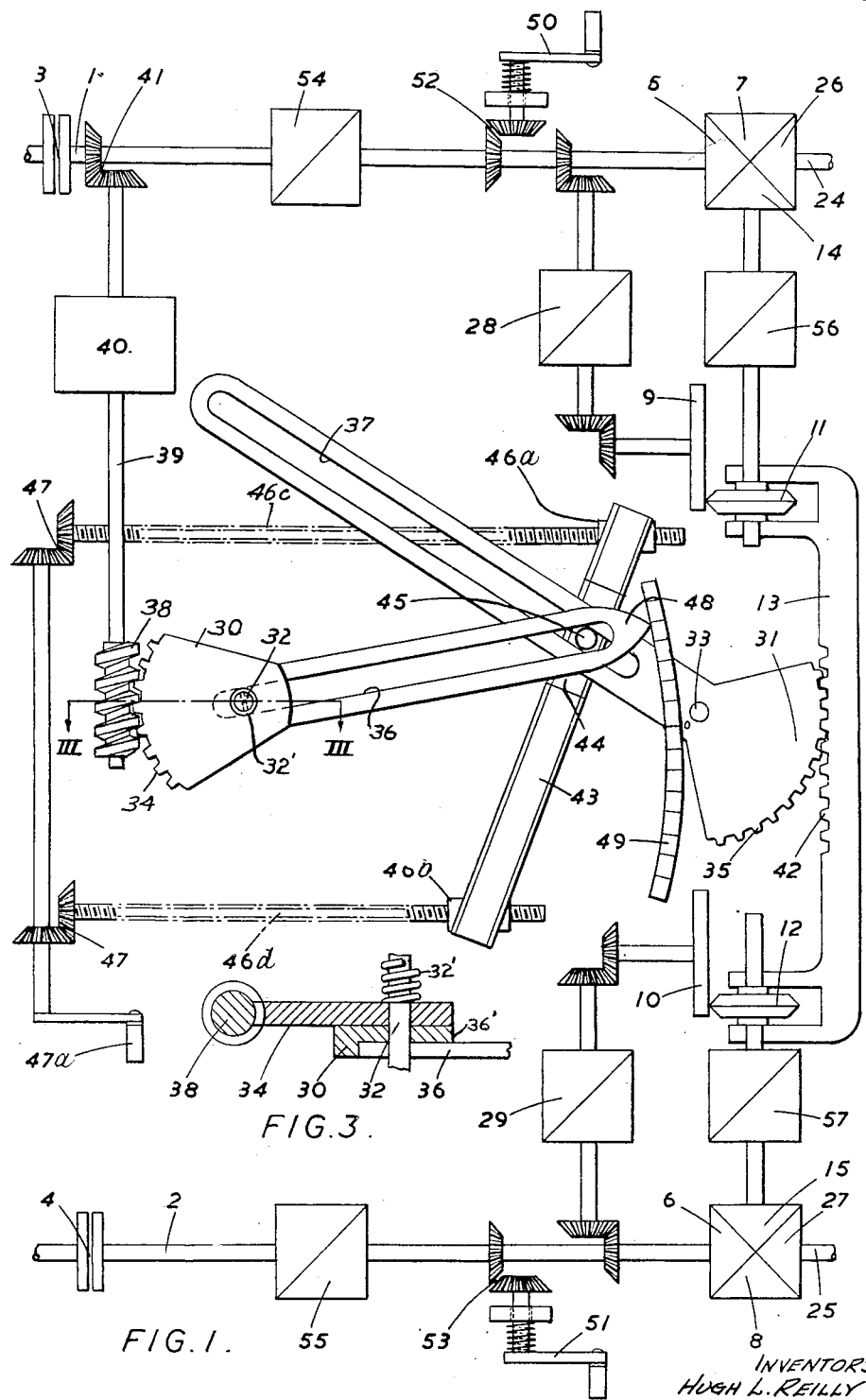
FIG.3.
FIG.1.
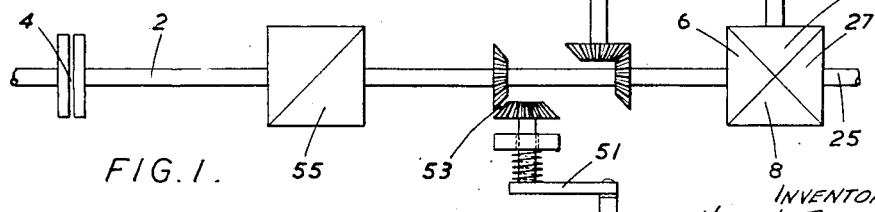
INVENTORS
HUGH L. REILLY &
KENNETH SEYMOUR
BY Young, Emery & Thompson
ATT'YS March 11, 1952  H. L. REILLY ET AL  2,588,763
NAVIGATION INSTRUMENT
Filed Feb. 26, 1948  2 SHEETS—SHEET 2

INVENTORS
HUGH L. REILLY &
KENNETH SEYMOUR
BY Young, Emery & Thompson
Attys.

Patented Mar. 11, 1952

2,588,763

UNITED STATES PATENT OFFICE 2,588,763

NAVIGATION INSTRUMENT

Hugh Lambert Reilly and Kenneth Seymour, Farnborough, England, assignors, by mesne assignments, to Kelvin & Hughes Limited, a British company Application February 26, 1948, Serial No. 11,023 In Great Britain October 10, 1945

Section 1, Public Law 690, August 8, 1946 Patent expires October 10, 1965

9 Claims. (Cl. 40—42)

This invention relates to navigation apparatus. Aircraft navigation apparatus, commonly referred to as a ground position indicator, is already known in which cardinal components of ground mileage are obtained by combining components of wind mileage with components of air mileage. Such apparatus may serve to provide automatically a continuous indication of the course and position of a craft on a true-to-scale map upon which distances are represented in terms of true miles.

The present invention has for an object to provide mechanism for producing from motion according to north-south mileage, movement proportional to the change with latitude, of the relationship between true distance and distance as represented on Mercator's projection, to enable motion according to projected distance to be derived automatically from motion according to mileage, and to enable a continuous indication or a plot of the course and position of a craft to be provided on maps drawn to Mercator's projection, more particularly on maps so drawn to Mercator's projection that each is true to scale at the mean, or other chosen, latitude thereof. For this purpose it is required to modify motion corresponding to true miles in respect of latitude north or south of the equator and, for a map having a true-to-scale latitude other than the equator, in respect also of latitude north or south of said true-to-scale latitude. The scale at any latitude $\lambda$ of such a map drawn true-to-scale at a chosen, say mean, latitude $\lambda'm$ is given by the equation:

Scale at $$\lambda = \text{Scale at equator} \times \frac{\text{Secant } \lambda}{\text{Secant } \lambda m}$$

and thus motion corresponding to distance as projected thereon can be derived by multiplying distance corresponding to true mileage by the secant of the latitude and dividing by the secant of the true-to-scale latitude thereof.

According to the invention, in a computing mechanism for producing, from movement corresponding to north-south mileage, movement proportional to the change with latitude of the relation of distance as represented on Mercator's projection to true distance, a coupling member in sliding connection with two levers to interconnect them operatively is itself slidable along a predetermined path such that movement of one lever corresponding to true distance north or south will, through the medium of the coupling member, bring about movement of the other lever proportional to the change with latitude in the relation of projected to true distance.

It is found that the desired movement can be obtained when the path of the coupling member is a straight line intersecting a straight line through the fulcrums of the two levers at an appropriate angle other then ninety degrees.

Such movement in accordance with the changing relation of projected to true distance may be used to vary accordingly the ratio of a variable gear mechanism to which motion according to mileage is applied so as to obtain therefrom motion corresponding to distance as represented on Mercator's projection.

Thus, for producing motion corresponding to distance as represented on a map drawn to Mercator's projection, according to the invention, variable ratio gear mechanism to which motion corresponding to true mileage is applied may have the ratio thereof adjusted automatically by a "gear" lever to which movement is imparted by a coupling member to which latter in turn movement is imparted by a "driving" lever moved in accordance with mileage in the north-south direction, said coupling member being in pin and slot or equivalent connection with both levers about a single axis and constrained to move along a predetermined path.

It will be seen that, owing to the nature of Mercator's projection, the required change in gear ratio will be increasingly greater as distance from the true-to-scale latitude other than the equator of a map increases, the more for such distance increase away from the equator than for such increase towards the equator. Also, the further the true-to-scale latitude of a map lies from the equator the greater will be the required gear ratio change with north-south distance away from said latitude.

Preferably, the predetermined path of the coupling member is a straight line and this and a straight line through the fulcrum of the gear and driving levers intersect at an angle other than ninety degrees, changes of gear ratio being directly proportional to movement of the gear lever, and the system being adjusted or set in use so that the axis of the coupling member is at the intersection of said lines when a craft is at the true-to-scale latitude of the map and so that said intersection is distant from the driving lever fulcrum by an amount corresponding to the true-to-scale latitude of said map.

For maps of which the true-to-scale latitude is the equator the difference between projected and true distance is, frequently, so small as to be negligible in practice and for use with these maps the system may be set so that the axis of the coupling member is at the fulcrum of the driving lever with the result that the gear lever will be held in a predetermined, e. g. zero, position.

It will be seen that where maps, some of which have true-to-scale latitudes north of the equator and some of which have true-to-scale latitudes south of the equator are to be used, a further adjustment or setting will be needed to allow for greater gear ratio changes to result either from north-south distance in the south direction when south of the equator or from distance in the north direction when north of the equator. For this purpose provision is made whereby movement in accordance with north-south mileage is imparted to the driving lever in reverse directions for operation with maps of which the true-to-scale latitudes are at opposite sides of the equator.

For automatically indicating or plotting course and position a single driving lever, coupling member and gear lever system may serve to adjust simultaneously the ratio of two variable ratio gears to which are applied motion corresponding to true milage north-south and east-west, so that they produce motion corresponding to projected distance north-south and east-west, respectively.

Preferably, motion corresponding to projected distance is obtained by using a three section differential gear to combine motion corresponding to true mileage with motion produced from motion corresponding to true mileage, by a variable ratio gear of which the ratio is adjusted automatically by the driving lever in either direction from zero in accordance with north-south mileage. Thus, the driven or output gear section of a three section or differential gear may be rotated in accordance with projected distance by driving a second section of the gear to rotate in accordance with true mileage and by driving the third section of the gear from the true mileage drive to the second element but through the medium of a variable ratio gear of which the ratio is adjusted automatically according to latitude by the driving lever, coupling member and gear lever system.

A mechanism in accordance with one form of the invention for producing motion according to distance as represented on a map drawn to Mercator's projection, is illustrated by the accompanying drawings of which Figures 1 and 2 are diagrams showing essential parts, Figure 3 being a fragmentary section view on the line III—III of Figure 1.

In this mechanism two shafts 1 and 2 rotated according to north-south and east-west mileage components, respectively, and driven through friction couplings 3 and 4 from corresponding shafts of a ground position indicator of known type (not shown) are connected on the one hand, to drive corresponding sections 5 and 6 (main bevel wheels for example) of two three-section or differential gears, indicated at 7 and 8 respectively, and, on the other hand, to drive the discs 9 and 10 of two discs and roller type continuously variable friction gears, respectively. The rollers 11 and 12 of these continuously variable gears are mounted upon a common carrier 13 which is slidable longitudinally to traverse said rollers 11 and 12 across the faces of the discs 9 and 10 diametrically thereof, simultaneously to adjust the ratios of both variable gears 9, 11 and 10, 12 to equal extents in either direction from zero when the rollers 11 and 12 are at the centers of the discs 9 and 10 and no drive is transmitted. Corresponding second sections 14 and 15 (the other main bevel wheels, for example) of the two three-section or differential gears 7 and 8 are connected to be driven by the rollers 11 and 12, respectively. A stylus indicated at 16 (Figure 2) is carried by a block 17 slidable on two traverser rods 18, 19 extending therethrough at right angles in the north-south and east-west directions, respectively, across a map table or holder.

Fast on the ends of the transverser rods 18, 19 for constraining them to move substantially perpendicular to each other, are spur gears 18a and 18b, 19a and 19b, meshing with racks 18c and 18d, 19c and 19d, respectively.

The transverser rods 18, 19 are connected operatively, by sprockets 21a and 21b, to endless chains 22a and 22b, and further sprockets 23a and 23b, and shafts 24 and 25 with third sections 26, 27 (the planet wheel carriers, for example), of the two three-section or differential gears 7 and 8 respectively, to be caused to traverse said map table, in accordance with the motion of said third gear sections 26, 27, respectively. Further gears 28, 29, of appropriate fixed ratios are interposed between the north-south and east-west driven shafts 1 and 2 and the discs 9 and 10 of the variable ratio friction gears, respectively, and as indicated at 56 and 57 between the rollers 11 and 12 of the latter and the differential gear elements 14 and 15 driven thereby.

The driving and gear levers 30 and 31 employed are similar and are fulcrummed at 32 and 33, respectively, towards their outer ends, where they are formed with toothed quadrants 34 and 35, respectively, and said levers are formed with rectilinear longitudinal slots 36 and 37. As shown in Figure 3, quadrant 34 is formed as a separate element of lever 30 and is freely mounted on fulcrum pin 32, whereas lever 30 is fixed on pivot pin 32. It will be noted that lever 30 is provided with a thickened portion 36' having a surface in frictional engagement with a corresponding portion of quadrant 34. A spring 32' is fixed at one end to pivot pin 32 and has its other end bearing upon quadrant 34 urging it against the surface of the part 36' to increase the frictional engagement between quadrant 34 and the thickened part 36' of lever 30. The quadrant 34 of the driving lever 30 has meshing therewith a worm 38 fast on a shaft 39 driven through a fixed ratio reversing gear 40 from the driven north-south mileage shaft 1, via a bevel gear 41, and the quadrant 35 of the gear lever 31 meshes with a rack 42 on the slidable carrier 13 of the variable ratio friction gear rollers 11 and 12.

A straight channel section guide 43 extends across the driving and gear levers 30 and 31, intersecting at a predetermined angle other than ninety degrees a straight line joining the fulcrum 32 and 33 of the two levers 30 and 31, and a block 44 slidable along this guide 43 has upstanding therefrom a pin 45 constituting a coupling member, which extends through the longitudinal slot 37 in the gear lever 31 into the slot 36 in the driving lever, 30. The above angle is "other than 90°" because the intersection of the two lines referred to gives two sets of equal angles, the first set being acute angles and the second set being obtuse angles, and it is merely the choice of these angles which determines whether or not the angle is described as either less than or more than 90°; in short, the lines must not intersect at right angles. The slot 36 is extended, see Figure 3, beyond the fulcrum 32 of the driving lever 30 towards the toothed quadrant 34 thereof, and the coupling member guide 43 is formed at its ends with nuts 46a and 46b, mounted on lead screws 46c and 46d, extending parallel to a line joining the fulcrums 32 and 33, which may be rotated in unison through the bevel gearing 47 and crank handle 47a to shift the guide 43 to any desired position, while keeping always at the same angle relative to the lead screws 46c and 46d. The nuts 46a and 46b are spaced along the lead screws as described because the cross bar 44 has to be at an angle other than 90° as explained above and this is only possible if they are spaced as stated. They are rotated in unison because non-uniformity of rotation would alter the angle of inclination of the cross bar 44, which would be equivalent to altering the true-to-scale or mean latitude of the map. It is assumed that the instrument is to be used with a certain map of Mercator projection with a certain latitude as a mean latitude. If the mean latitude of the Mercator projection map is changed, only then will the inclination of the cross bar 44 have to be altered. One of said positions crosses the inter-fulcrum line at the fulcrum 32 of the driving lever 30. The driving lever 30 carries a pointer 48 which moves over a scale 49 graduated in terms of mileage away from true-to-scale latitude, or zero position of the pointer, towards or further away from the equator. The pointer 48 is at zero on this scale 49 when the coupling member pin 45 lies on said inter-fulcrum line. Also the gear lever quadrant 35 is so meshed with the friction gear roller carrier rack 42 that the rollers 11 and 12 are located at the centres of the associated discs 9 and 10 and the friction gears are thus at zero ratio and transmit no drive, when the driving lever pointer 48 is at zero on the scale 49. In order that the lever 30 may be moved manually to adjust the pointer 48 relative to the scale 49, despite the quadrant 34 being held by the worm 38, said quadrant 34 is formed separately from the lever 30 and is held in such frictional engagement with the quadrant 34 as will enable the latter to drive the lever 30 but yet permit slip to take place during such manual adjustment.

For adjusting or setting the stylus 16, adjusting handles 50 and 51 may be brought at will into driving connection via bevel gears 52 and 53, respectively, with the driven north-south and east-west mileage shafts, respectively, rotation of which latter by means of said handles 50 and 51 is permitted by slip in the friction couplings 3 and 4 through which said shafts 1 and 2 are normally driven.

In order that the apparatus may be used with maps drawn to Mercator's projection but to different scales multi-speed gear boxes 54 and 55 affording corresponding different ratios are interposed in the two driven mileage shafts 1 and 2 between the friction couplings 3 and 4 and the bevel gears 52 and 53 at which the adjusting handles 50 and 51, respectively, impart a drive thereto. Further, gears 56 and 57 of fixed ratio are interposed between the variable gears 9, 11 and 10, 12 and the three section or differential gears 7 and 8, respectively. The drive through the reversing gear 40 to the driving lever 30, is taken, as shown, from that section of the driven north-south mileage shaft 1 between the friction couplings 3 and the multi-speed gear box 54 thereof.

In use, with a map drawn to Mercator's projection with its mean latitude true-to-scale, the multi-speed gear boxes 54 and 55 having been set to appropriate ratios, the reversing gear 40 having been set to impart movement to the driving lever 30 in the appropriate direction according as the mean latitude of the map is north or south of the equator, the coupling member guide 43 having been set to whichever position corresponds to said mean latitude, a map (not shown) having been positioned on the map table, and the position of the craft being known, the adjusting handle 50 is used to place the stylus 16 on this true-to-scale mean latitude, the driving lever pointer 48 is set by hand to zero on the scale 49, thereby positioning the coupling member pin 45 on the inter-fulcrum line and setting the friction gears 9, 11 and 10, 12 (to zero ratio) and then both handles 50 and 51 are used to set the stylus 16 to the position of the craft on the map, whereupon a switch or other control member (not shown) is actuated to initiate continuous rotation of the north-south and east-west mileage shafts 1 and 2 in accordance with true mileage. Thereafter, the stylus 16 is caused automatically to tranverse successive points on the map simultaneously with traversal by the craft of corresponding positions on the earth's surface and so to plot the course of the craft instantaneously, and to a degree of acuracy which is sufficient for all practical navigational purposes.

It will be appreciated that the motion afforded by a mechanism according to the invention may in some cases be applied to an optical system to move a light spot or graticule image, instead of a stylus, over a map or chart.

We claim:

1. A mechanism for producing, from movement corresponding to north-south mileage, movement proportional to the change with latitude in the relation of distance as represented on Mercator's projection to true distance, comprising a first shaft driven by the north-south shaft of a ground position indicator, a second shaft driven by the east-west shaft of said ground position indicator, a first differential gear having a first input, a second input and an output, said first input being driven by said first shaft, a second differential gear having a first input, a second input and an output, said first input of said second differential gear being driven by said second shaft, a first continuously variable speed gear, means for driving said variable speed gear from said first shaft, means whereby the second input of said first differential gear is driven by said variable speed gear, a second continuously variable speed gear, means for driving said second variable speed gear from said second shaft, means whereby the second input of said second differential gear is driven by said second variable speed gear, a common carrier for the driven elements of said variable speed gears, said carrier having a rack along one edge thereof, a worm gear, means for driving said worm gear from said first shaft, a driving lever pivoted between its two ends, said lever having a toothed quadrant gear at one end engageable with said worm gear and a longitudinal slot, a gear lever pivoted between its ends, said gear lever having a toothed quadrant gear at one end engageable with the rack of said carrier and a longitudinal slot, a guide member, a block slidable in said guide member, said block having a pin therein for engagement with the slots in the said levers, whereby movement of said driving lever about its pivot point causes the block to slide in the guide member resulting in a movement of said gear lever about its pivot point and causing said carrier to slide longitudinally, thereby varying the drive ratio of said continuously variable gears, and means driven by the output of said differential gears for constantly indicating the corrected position on a map drawn to Mercator's projection.

2. A mechanism for producing, from movement corresponding to north-south mileage, movement proportional to the change with latitude in the relation of distance as represented on Mercator's projection to true distance, comprising a first shaft driven by the north-south shaft of a ground position indicator, a second shaft driven by the east-west shaft of said ground position indicator, a first differential gear having a first input, a second input and an output, said first input being driven by said first shaft, a second differential gear having a first input, a second input and an output, said first input of said second differential gear being driven by said second shaft, a first continuously variable speed friction gear having a driving disc and a driven wheel slidable longitudinally across the face of said disc, means for driving the disc of said friction gear from said first shaft, means whereby the second input of said first differential gear is driven by said wheel, a second continuously variable speed friction gear having a driving disc and a driven wheel slidable longitudinally across the face of said disc, means for driving the disc of said second friction gear from said second shaft, means whereby the second input of said second differential gear is driven by the wheel of said second friction gear, a common carrier for the wheels of said friction gears for sliding said wheels longitudinally across the faces of said discs, said carrier having a rack along one edge thereof, a worm gear, means for driving said worm gear from said first shaft, a driving lever pivoted between its two ends, said lever having a toothed quadrant gear at one end engageable with said worm gear and a rectilinear longitudinal slot, a gear lever pivoted between its ends, said gear lever having a toothed quadrant gear at one end engageable with the rack of said carrier and a rectilinear longitudinal slot, a straight channel section guide, a block slidable in said guide, said block having a pin therein for engagement with the slots in said levers, whererby movement of said driving lever about its pivot point causes the block to slide in the guide with a corresponding movement of said gear lever about its pivot point thereby causing said carrier to slide longitudinally and varying the drive ratio of the variable speed friction gears, and means driven by the output of said differential gears for continuously indicating the corrected position on a map drawn to Mercator's projection.

3. A mechanism for producing, from movement corresponding to north-south mileage, movement proportional to the change with latitude in the relation of distance as represented on Mercator's projection to true distance, comprising a shaft coupled to the north-south shaft of a ground position indicator, a differential gear having a first input, a second input and an output, said first input being driven by said shaft, a continuous variable speed gear means for driving said variable speed gear from said shaft, means whereby the second input of said differential gear is driven by said variable speed gear, a carrier for the driven element of said variable speed gear, said carrier having a rack along one edge thereof, a worm gear, means for driving said worm gear from said shaft, a driving lever having a toothed quadrant gear at one end engageable with said worm gear and a longitudinal slot, said lever being pivoted between its two ends, a gear lever having a toothed quadrant gear at one end engageable with the rack of said carrier and a longitudinal slot, said gear lever being pivoted between its two ends, a guide member, a block slidable in said guide member, said block having a pin therein for engagement with the slots in the said levers, whereby movement of said driving lever about its pivot point causes the block to slide in said guide member with a corresponding movement of said gear lever about its pivot point and causing said carrier to move longitudinally to vary the drive ratio of said continuously variable speed gear, and means driv hv the output of the differential gear for continuously indicating the correct north-south position on a map drawn to Mercator's projection.

4. A mechanism for producing, from movement corresponding to north-south mileage, movement proportional to the change with latitude in the relation of distance as represented on Mercator's projection to true distance, comprising a shaft coupled to the north-south shaft of a ground position indicator, a differential gear having a first input, a second input and an output, said first input being driven by said shaft, a continuous variable speed friction gear having a driving disc and a driven wheel slidable longitudinally across the face of said disc, means for driving the disc of said friction gear from said shaft, means whereby the second input of said differential gear is driven by the wheel of said friction gear, a carrier for the wheel of said friction gear for sliding said wheel longitudinally across the face of said disc, said carrier having a rack along one edge thereof, a worm gear, means for driving said worm gear from said shaft, a driving lever having a toothed quadrant gear at one end engageable with said worm gear and a longitudinal slot, said lever being pivoted between its two ends, a gear lever having a toothed quadrant gear at one end engageable with the rack of said carrier and a longitudinal slot, said gear lever being pivoted between its two ends, a guide member, a block slidable in said guide member, said block having a pin therein for engagement with the slots in the said levers, whereby movement of said driving lever about its pivot point causes the block to slide in said guide member with a corresponding movement of said gear lever about its pivot point and causing said carrier to move longitudinally to vary the drive ratio of said continuously variable speed gear, the path of said block in said guide member being a straight line intersecting a straight line through the pivot points of the two levers at an appropriate angle greater than ninety degrees, and means driven by the output of the differential gear for continuously indicating the correct north-south position on a map drawn to Mercator's projection.

5. In a mechanism for producing, from movement corresponding to north-south mileage, movement proportional to the change with latitude in the relation of distance as represented on Mercator's projection to true distance, having first and second shafts driven by the north-south and east-west shafts respectively of a ground position indicator, first and second differential gears each having a first input, a second input and an output, said first input of the first differential gear being driven by said first shaft and said first input of the second differential gear being driven by said second shaft, first and second continuously variable speed gears, means for driving the first variable speed gear from said first shaft, means for driving the second variable speed gear from said second shaft, means whereby the second input of said first differential gear is driven by said first variable speed gear, means whereby the second input of said second differential gear is driven by said second variable speed gear, means for continuously varying the drive ratios of the two said variable speed gears in relation to distance as represented on Mercator's projection to true distance, and means driven by the output of said differential gears for constantly indicating the corrected position on a map drawn to Mercator's projection, said means for continuously varying the drive ratios of the two said variable speed gears comprising a longitudinally movable common carrier for the output elements of said variable speed gears, said carrier having a rack along one edge thereof, a worm gear, means for driving said worm gear from said first shaft, two levers pivotable between their ends, each of said levers having a toothed quadrant gear at one end and a longitudinal slot, said quadrant gear of one lever being in mesh with said worm gear and said quadrant gear of the other lever being in mesh with the rack of said carrier, and a coupling member extending through the slots of said two levers, a guide for guiding the movement of said coupling member during pivoting of said levers whereby pivoting motion of the lever driven by said worm gear produces a pivoting motion in the other lever thereby causing said carrier to move longitudinally to continuously vary the drive ratios of the two said variable speed gears.

6. In a mechanism for producing, from movement corresponding to north-south mileage, movement proportional to the change with latitude in the relation of distance as represented on Mercator's projection to true distance, having first and second shafts driven by the north-south and east-west shafts respectively of a ground position indicator, first and second differential gears each having a first input, a second input and an output, said first input of the first differential gear being driven by said first shaft and said first input of the second differential gear being driven by said second shaft, first and second continuously variable speed friction gears, each of said variable speed gears having a driving disc and a driven wheel slidable longitudinally across the face of said disc, means for driving the disc of said first variable speed gear from said first shaft, means for driving the disc of said second variable speed gear from said second shaft, means whereby the second input of said first differential gear is driven by the wheel of said first variable speed gear, means whereby the second input of said second differential gear is driven by the wheel of said second variable speed gear, means for continuously varying the drive ratios of the two said variable speed gears in relation to distance as represented on Mercator's projection to true distance, and means driven by the output of said differential gears for constantly indicating the corrected position on a map drawn to Mercator's projection, said means for continuously varying the drive ratios of the two said variable speed gears comprising a longitudinally movable common carrier for the wheels of said two variable speed gears, said carrier having a rack along one edge thereof, a worm gear, means for driving said worm gear from said first shaft, two levers pivotable between their ends, each of said levers having a toothed quadrant gear at one end and a longitudinal slot, said quadrant gear of one lever being in mesh with said worm gear and said quadrant gear of the other lever being in mesh with the rack of said carrier, a guide member and a coupling member operable in the slots of said two levers and slidable in said guide member, the path of said coupling member in said guide member being a straight line intersecting a straight line through the pivot points of the two levers at an appropriate angle greater than ninety degrees, whereby pivoting motion of the lever driven by said worm gear produces a pivoting motion in the other lever thereby causing said carrier to move longitudinally to continuously vary the drive ratios of the two said variable speed gears.

7. A mechanism for producing, from movement corresponding to north-south mileage, movement proportional to the change with latitude in the relation of distance as represented on Mercator's projection to true distance, comprising a first shaft driven by the north-south shaft of a ground position indicator, a second shaft driven by the east-west shaft of said ground position indicator, a first differential gear having a first input, a second input and an output, said first input being driven by said first shaft, a second differential gear having a first input, a second input and an output, said first input of said second differential gear being driven by said second shaft, a first continuously variable speed friction gear having a driving disc and a driven wheel slidable longitudinally across the face of said disc, means for driving the disc of said friction gear from said first shaft, means whereby the second input of said first differential gear is driven by said wheel, a second continuously variable speed friction gear having a driving disc and a driven wheel slidable longitudinally across the face of said disc, means for driving the disc of said second friction gear from said second shaft, means whereby the second input of said second differential gear is driven by the wheel of said second friction gear, a common carrier for the wheels of said friction gears for sliding said wheels longitudinally across the faces of said discs, said carrier having a rack along one edge thereof, a worm gear, means for driving said worm gear from said first shaft, a driving lever pivoted between its two ends, said lever having a toothed quadrant gear at one end engageable with said worm gear and a rectilinear longitudinal slot, a gear lever pivoted between its ends, said gear lever having a toothed quadrant gear at one end engageable with the rack of said carrier and a rectilinear longitudinal slot, a straight channel section guide, a block slidable in said guide, said block having a pin therein for engagement with the slots in said levers, whereby movement of said driving lever about its pivot point causes the block to slide in the guide with a corresponding movement of said gear lever about its pivot point thereby causing said carrier to slide longitudinally and varying the drive ratio of the variable speed friction gears, the path of said block in said guide being a straight line intersecting a straight line through the pivot points of the two levers at an appropriate angle greater than ninety degrees, and means driven by the output of said differential gears for continuously indicating the corrected position on a map drawn to Mercator's projection.

8. A mechanism for producing, from movement corresponding to north-south mileage, movement proportional to the change with latitude in the relation of distance as represented on Mercator's projection to true distance, comprising a first shaft driven by the north-south shaft of a ground position indicator, a second shaft driven by the east-west shaft of said ground position indicator, a first differential gear having a first input, a second input and an output, said first input being driven by said first shaft, a second differential gear having a first input, a second input and an output, said first input of said second differential gear being driven by said second shaft, a first continuously variable speed friction gear having a driving disc and a driven wheel slidable longitudinally across the face of said disc, means for driving the disc of said friction gear from said first shaft, means whereby the second input of said first differential gear is driven by said wheel, a second continuously variable speed friction gear having a driving disc and a driven wheel slidable longitudinally across the face of said disc, means for driving the disc of said second friction gear from said second shaft, means whereby the second input of said second differential gear is driven by the wheel of said second friction gear, a common carrier for the wheels of said friction gears for sliding said wheels longitudinally across the faces of said discs, said carrier having a rack along one edge thereof, a worm gear, means for driving said worm gear from said first shaft, a driving lever pivoted between its two ends, said lever having a toothed quadrant gear at one end engageable with said worm gear and a rectilinear longitudinal slot, a gear lever pivoted between its ends, said gear lever having a toothed quadrant gear at one end engageable with the rack of said carrier and a rectilinear longitudinal slot, a straight channel section guide, a block slidable in said guide, said block having a pin therein for engagement with the slots in said levers, whereby movement of said driving lever about its pivot point causes the block to slide in the guide with a corresponding movement of said gear lever about its pivot point thereby causing said carrier to slide longitudinally and varying the drive ratio of the variable speed friction gears, the path of said block in said guide being a straight line intersecting a straight line through the pivot points of the two levers at an appropriate angle greater than ninety degrees, means driven by the output of said differential gears for continuously indicating the corrected position on a map drawn to Mercator's projection, and means for manual adjustment of the first and second shafts for adjusting the position indicator on the map to correspond to the position of a craft on the earth's surface.

9. A mechanism for producing, from movement corresponding to north-south mileage, movement proportional to the change with latitude in the relation of distance as represented on Mercator's projection to true distance, comprising a first shaft driven by the north-south shaft of a ground position indicator, a second shaft driven by the east-west shaft of said ground position indicator, a first differential gear having a first input, a second input and an output, said first input being driven by said first shaft, a second differential gear having a first input, a second input and an output, said first input of said second differential gear being driven by said second shaft, a first continuously variable speed friction gear having a driving disc and a driven wheel slidable longitudinally across the face of said disc, means for driving the disc of said friction gear from said first shaft, means whereby the second input of said first differential gear is driven by said wheel, a second continuously variable speed friction gear having a driving disc and a driven wheel slidable longitudinally across the face of said disc, means for driving the disc of said second friction gear from said second shaft, means whereby the second input of said second differential gear is driven by the wheel of said second friction gear, a common carrier for the wheels of said friction gears for sliding said wheels longitudinally across the faces of said discs, said carrier having a rack along one edge thereof, a worm gear, means for driving said worm gear from said first shaft, a driving lever pivoted between its two ends, said lever having a toothed quadrant gear at one end engageable with said worm gear and a rectilinear longitudinal slot, a gear lever pivoted between its ends, said gear lever having a toothed quadrant gear at one end engageable with the rack of said carrier and a rectilinear longitudinal slot, a straight channel section guide, a block slidable in said guide, said block having a pin therein for engagement with the slots in said levers, whereby movement of said driving lever about its pivot point causes the block to slide in the guide with a corresponding movement of said gear lever about its pivot point thereby causing said carrier to slide longitudinally and varying the drive ratio of the variable speed friction gears, the path of said block in said guide being a straight line intersecting a straight line through the pivot points of the two levers at an appropriate angle greater than ninety degrees, means driven by the output of said differential gears for continuously indicating the corrected position on a map drawn to Mercator's projection, means for manual adjustment of the first and second shafts for adjusting the position indicator on the map to correspond to the position of a craft on the earth's surface, and means for manual adjustment of the adjustable guide member for presetting the drive ratio of said variable gears to correspond to the setting of said position indicator on said map.

HUGH LAMBERT REILLY.
KENNETH SEYMOUR.

REFERENCES CITED

The following references are of record in the file of this patent:

UNITED STATES PATENTS

| Number | Name | Date |
|---|---|---|
| 2,022,275 | Davis | Nov. 26, 1935 |
| 2,130,224 | Boykow | Sept. 13, 1938 |
| 2,395,351 | Sohn | Feb. 19, 1946 |

FOREIGN PATENTS

| Number | Country | Date |
|---|---|---|
| 601,893 | Great Britain | May 13, 1948 |